United States Patent [19]
Cao et al.

[11] Patent Number: 5,753,159
[45] Date of Patent: May 19, 1998

[54] INJECTION SPIN MOLDING PROCESS

[75] Inventors: Bangshu Cao, Chapel Hill; Thomas A. Shepard, Apex, both of N.C.

[73] Assignee: Becton, Dickinson and Company, Franklin Lakes, N.J.

[21] Appl. No.: 683,829

[22] Filed: Jul. 18, 1996

Related U.S. Application Data

[62] Division of Ser. No. 428,975, Apr. 26, 1995, Pat. No. 5,571,583.

[51] Int. Cl.[6] .......................... B29C 41/04; B29C 45/00
[52] U.S. Cl. ................................. 264/312; 264/328.12
[58] Field of Search ................. 264/312, 329.12

[56] References Cited

U.S. PATENT DOCUMENTS 3,907,952  9/1975  Cleereman .......................... 264/12
4,288,478  9/1981  Kinoshita ........................... 264/12

Primary Examiner—James Derrington
Attorney, Agent, or Firm—Richard E. Brown

[57] ABSTRACT

A molding process includes flowing a polymer melt into the cavity of a mold which includes a core pin. After the mold is filled and skin layers of solidified polymer have formed adjacent the mold wall and core pin wall, the core pin is spun transversely to the direction of polymer melt flow. The invention includes hollow articles of improved mechanical properties made by the process.

3 Claims, 5 Drawing Sheets

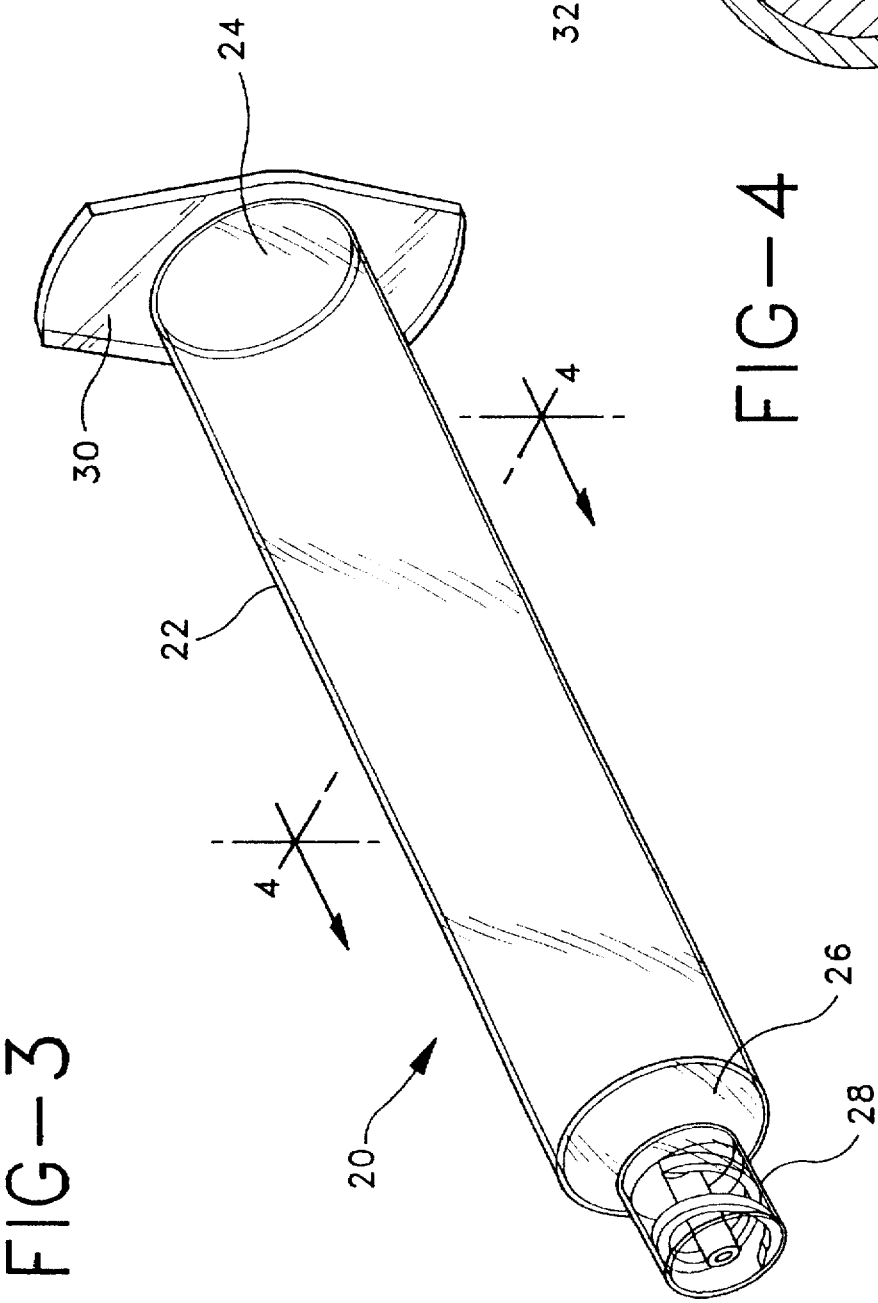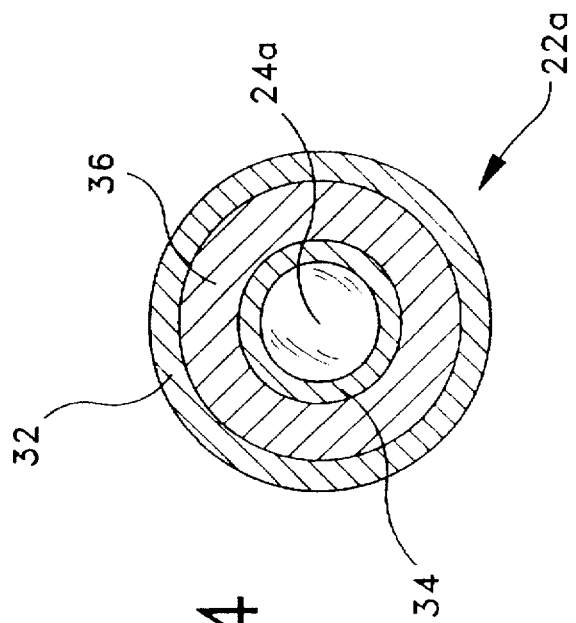

INJECTION SPIN MOLDING PROCESS

This is a division of application Ser. No. 08/428,975, filed Apr. 26, 1995, now U.S. Pat. No. 5,571,583.

BACKGROUND OF THE INVENTION

1. Field of the Invention.

This invention relates to an improved molding process and to hollow plastic articles made thereby.

2. Background.

Molding is a process in which melted or plasticized polymeric material is forced into a mold where it is held until removed in a solid state having a shape which duplicates the cavity of the mold. The process conventionally consists of three basic operations: (1) raising the temperature of the plastic to a point where it will flow under pressure through a gate and into the mold cavity, (2) allowing the plastic to solidify in the mold (conventionally referred to as hold time), and (3) opening the mold to eject the plastic frozen in the shape of the mold cavity.

During molding, the macromolecules of most polymer melts orient themselves in the direction of the flow, conventionally referred to as the machine direction, MD, as a result of shear stress. Orientation in the MD is of course experienced to a greater degree by molecules close to the mold wall than by molecules more distant from the wall because polymer molecules in close proximity to the wall are subject to greater shear stress. This situation leads to a skin-core structure in which the orientation of the molecules of the core layer is essentially random because of the lower shear stress experienced by molecules more distant from the mold walls. Further, the skin-core morphology is augmented because molecules in the skin layer come into contact with the cold mold and freeze sooner compared to the molecules in the core layer which have a longer time to relax.

While the mechanical performance of a molded polymeric article is dominated by its chemical nature, the effect of morphological structure has been investigated, and better mechanical properties in the skin layer than in the core layer have been attributed to molecular orientation. Since many injection molded articles, particularly medical articles, have thin walls, they are subject to stress cracking on impact. Accordingly, there is a need in the molding art for a process to further enhance mechanical properties. This invention addresses this need.

SUMMARY OF THE INVENTION

One aspect of the invention is a molding process for making polymeric articles. A molten polymer is flowed into the cavity of a mold containing a core pin. When the mold is full and polymer adjacent to the walls of the mold and core pin has begun to solidify into skin layers, but a core layer between the skin layers is still molten, the core pin is rotated in a transverse direction (hereinafter the TD) relative to the MD. After the core layer is completely solid, the article is removed from the mold.

A second aspect of the invention is a hollow article made by the process of the invention. The article has a wall having the thickness of the cavity. The wall has an outer skin layer adjacent the mold wall and an inner skin layer adjacent the wall of the core pin. The two skin layers surround a core layer. The polymer molecules in the skin layers are oriented substantially in the MD due to shear stress induced by flow over the mold and core pin walls. The polymer molecules in the core layer are oriented substantially in the direction of rotation of the core pin, the TD.

The injection spin process of the invention provides articles having advantages over articles made by conventional molding processes which do not include spinning of the core pin. The well known weld lines of hollow articles made by conventional injection molding are almost completely eliminated by core pin spinning. Weld lines are known to be a primary site of fracture, thus articles made by the process of the invention are of improved impact strength. The articles also have improved mechanical properties, such as tensile strength and modulus, due to the transverse molecular orientation in the core layer, and are more uniform in thickness.

BRIEF DESCRIPTION OF THE DRAWINGS

FIG. 3 is a perspective view of a syringe barrel, the view being generic for a syringe barrel of the invention and a conventional syringe barrel;

FIG. 4 is a horizontal sectional view of the syringe barrel of FIG. 3;

DETAILED DESCRIPTION

While this invention is satisfied by embodiments in many different forms, there will herein be described in detail preferred embodiments of the invention, with the understanding that the present disclosure is to be considered as exemplary of the principles of the invention and is not intended to limit the invention to the embodiments illustrated and described. The scope of the invention will be measured by the appended claims and their equivalents.

Figure 1:
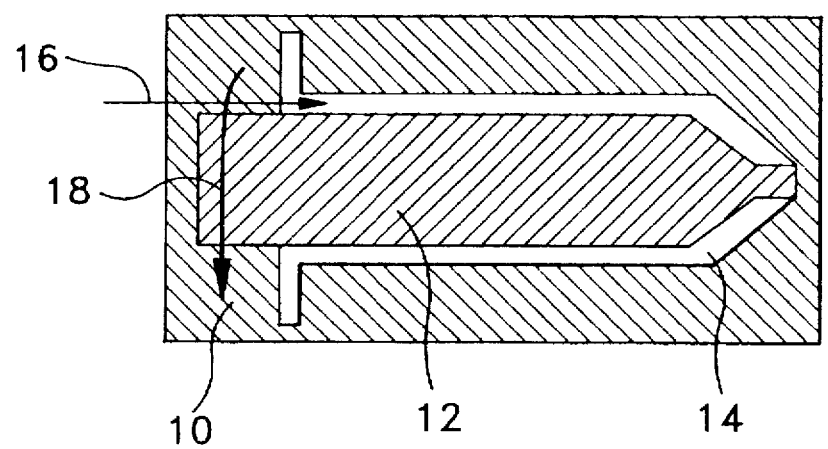
FIG. 1 is a diagrammatic illustration of the MD and TD in the injection molding process of the invention.
Figure 2:
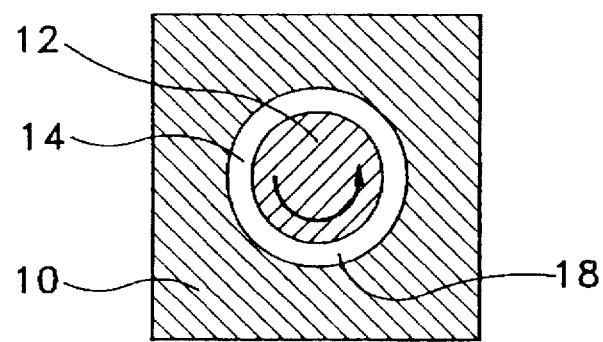
FIG. 2 is a diagrammatic illustration of core pin spinning in the process of the invention.

The injection spin molding process of the present invention may be carried out in any conventional injection molding machine which includes a core pin inside of the mold for production of hollow articles. The process includes rotation of the core pin in the TD relative to the MD prior to solidification of the polymer in the core layer. FIGS. 1 and 2 diagramatically illustrate the process. In FIGS. 1 and 2, a syringe barrel mold 10 has a core pin 12 therein. Mold 10 and core pin 12 define a mold cavity 14 which receives a molten polymer in the MD (arrow 16) through a gate (not shown) in the conventional manner. After the mold is closed and the cavity is filled, the core pin is rotated in the TD, as shown by arrow 18. Without wishing to be limited thereby, Example I describes one suitable apparatus for performing the injection spin process of the invention. Modifying a conventional injection molding machine for transverse rotation of a core pin is easily within the purview of one skilled in the art, and no further details regarding the apparatus for spinning of a core pin are needed for a full understanding of the invention.

In the first step of the process, a molten polymer is injected, preferably under pressure, into a mold cavity which contains a core pin. As a result of the flow of the molten polymer and the rapid solidification on contact with the cold walls of the mold, the polymer molecules assume a longitudinal orientation in the MD. Orientation is high near the wall of the mold and near the wall of the core pin due to flow shear stress, giving two skin layers encapsulating a core layer of molten polymer in the center of the flow channel. Prior to solidification, orientation in the core layer is substantially random due to the lower shear stress and the longer time which the molten molecules in the core layer have to relax before solidifying.

In the second step, the core pin is rotated in the TD prior to solidification of the core layer (FIGS. 1 and 2). The transverse rotation of the core pin through the molten polymer molecules causes a drag flow induced shear stress resulting in a molecular orientation in the core layer which is substantially perpendicular to the flow direction. As described below, the MD and TD orientation of the molecules in the skin and core portions respectively provides the article of the invention with enhanced mechanical properties compared to an article of the same polymer which was not subjected to core pin rotation during molding.

It is evident that the timing sequence for the initiation and cessation of core pin rotation is critical in the sense that rotation of the pin must take place subsequent to solidification of the skin layers but prior to solidification of the core layer. For a 20 cc syringe barrel, it has been found that rotation may be started from about 1 to 2 sec., preferably 1.5 to 1.8 sec. after completion of injection and closing of the mold. It will be appreciated, however, that other parameters may affect the timing sequence, such as mold temperature, melt temperature and injection pressure. Likewise, it is apparent that the timing sequence will be different for larger or smaller articles, or articles of different wall thickness. One skilled in injection molding can easily-determine a suitable timing sequence for the article desired, and no further description of this aspect of the invention is needed.

The core pin may be rotated at any convenient rate. The rate will of course depend on the strength of the motor turning the core pin and on the temperature and viscosity of the molten polymer. Any number of rotations may be performed, and rotation is preferably continued until the polymer in the core layer freezes. In practice, it has been found that about three rotations of the core pin are sufficient to attain maximum orientation of the core layer molecules, and thus maximum improvement of the mechanical properties of the article.

Any polymer which can be obtained in a molten state can be injection spin molded by the process of the invention. Preferred polymers are thermoplastic. Without wishing to be limited thereby, suitable polymers are polyesters, polycarbonates, polyamides, polyurethanes, polystyrene, liquid crystalline polymers, polysulfones, acrylics and preferably polyolefins. The most preferred polymers are polyethylene, polypropylene and blends and copolymers thereof. In this disclosure, isotactic polypropylene (IPP) which has been injection spin molded is referred to as IPP-S and IPP conventionally molded (without core pin spinning) is referred to as IPP-N.

The article which may be made by the process of the invention has a wall which defines a void resulting from the space occupied within the mold by the core pin. Thus the article is hollow. The wall may be a side wall which, acting together with a bottom wall, defines the void as an interior volume. The article may have any external shape, such as annular, elliptical and rectangular. It may be of any dimension. Preferred articles are cylindrical, most preferably medical articles such as tubes, vials, burets, pipettes, tubing, syringe barrels, syringe plungers and the like. The invention also encompasses large articles such as industrial tubing, bottles, barrels and the like.

The article may have any wall thickness, preferably about 0.25 mm to 10 mm. The ratio of the thickness of the skin layer to the core layer may be selected according to the properties desired and depends on the molding parameters. Preferred ratios may be about 0.01 to 10.0.

FIG. 3 illustrates a typical syringe barrel. Since a barrel made by conventional injection molding cannot be distinguished visually from the barrel of the invention, FIG. 3 is generic for both injection molded barrels and injection spinmolded barrels. In FIG. 3, a syringe barrel 20 has an annular wall 22 which defines an open end 24 for receiving a syringe plunger (not shown). Wall 22 has a tapering portion 26 and a mounting portion 28 for attachment of a needle (not shown). A grasping tab 30 may be affixed to wall 22.

In FIG. 4 the syringe barrel of FIG. 3 is shown in horizontal section to illustrate the composition of the barrel wall, 22a. (In FIG. 4–6, like or similar elements in the various figures are given the same reference numeral followed by a letter suffix.) Wall 22a surrounds and defines a void 24a and has an outer skin layer 32, an inner skin layer 34 and a core layer 36.

Figure 6:
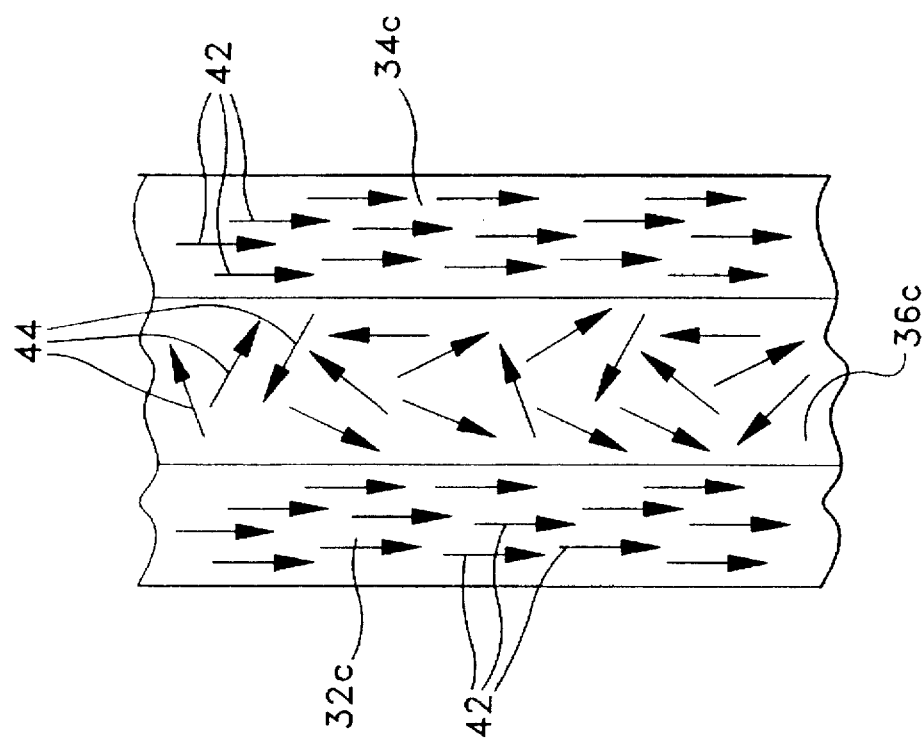
FIG. 6 illustrates a section of the wall of the syringe barrel of FIG. 3 showing orientation of the polymer molecules resulting from conventional injection molding.
Figure 5:
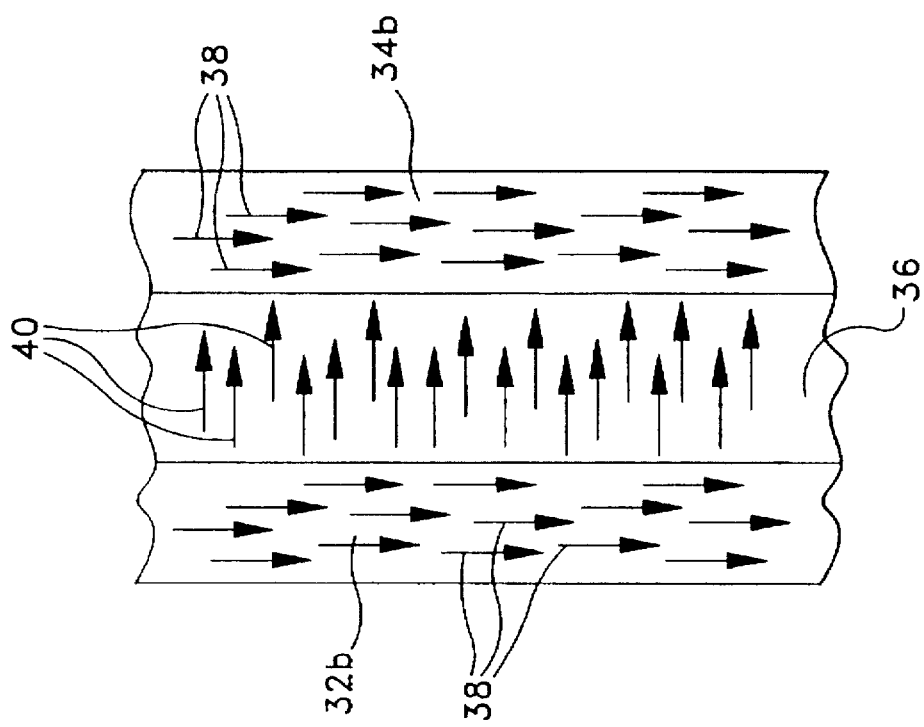
FIG. 5 illustrates a section of the wall of the syringe barrel of FIG. 3 showing orientation of the polymer molecules resulting from the injection spin process of the invention.

While the syringe barrel of the invention and prior art syringe barrels made by injection molding both have a core layer 36 and skin layers 32 and 34, they differ in the orientation of the polymer molecules, and this orientation accounts for the improved mechanical properties of the barrel of the invention. FIGS. 5 and 6 are wall sections of the syringe barrel of FIG. 3 which illustrate the molecular orientation of the polymer molecules in the skin layers and the core layer for the barrel of the invention and the prior art respectively. In FIG. 5, the polymer molecules of skin layers 32b and 34b which are oriented in the direction of polymer flow into the mold are represented by the vertical arrows 38 and the polymer molecules of core layer 36b oriented by spinning the core pin are represented by the horizontal arrows 40.

FIG. 6 illustrates molecular orientation in prior art syringe barrels made by conventional injection molding, i.e., without core pin spinning. In FIG. 6, the molecules 42 of the skin layers 32c and 34c have substantially the same orientation as the skin layers of the barrel of the invention, but the molecular orientation of the polymer molecules 44 in core layer 36c is substantially random, as shown by the arrows.

Figure 9:
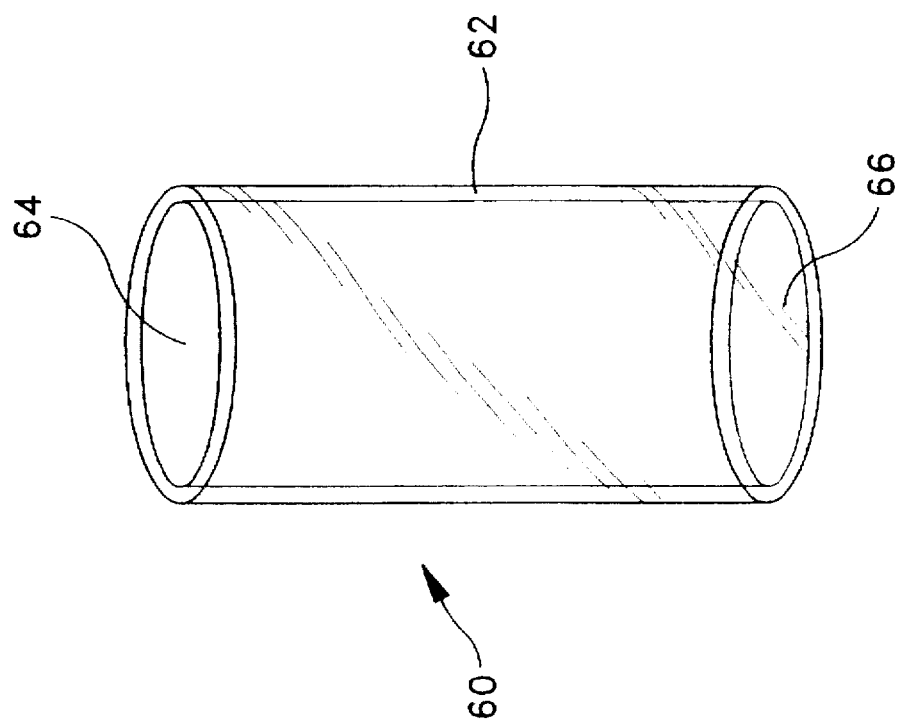
FIGS. 8 and 9 are perspective views of a tube and a tubing of the invention.
Figure 8:
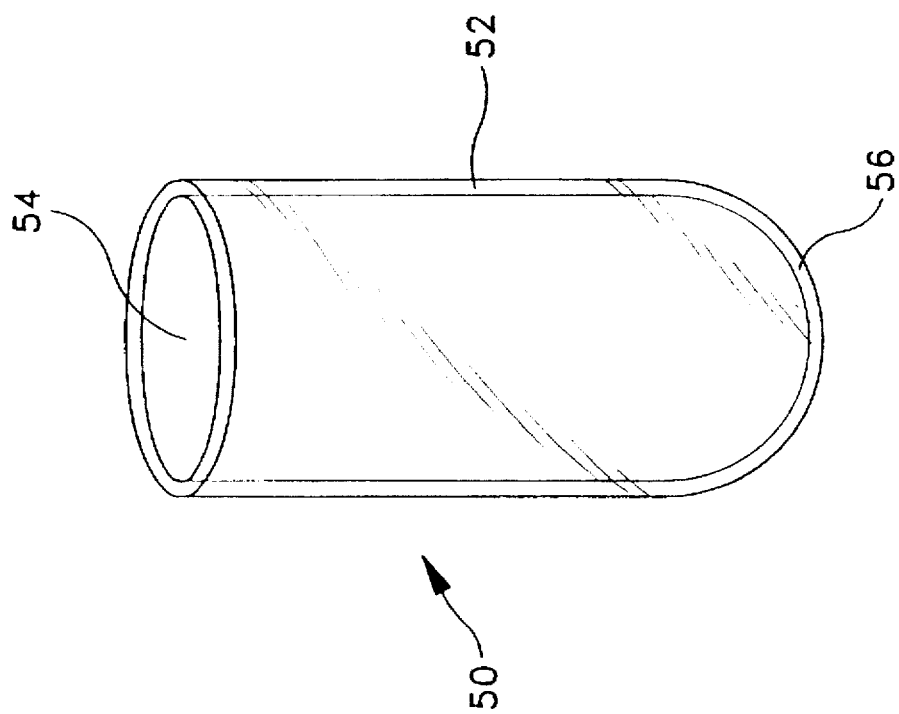

FIGS. 8 and 9 illustrate a tube and tubing respectively. In FIG. 8, tube 50 has a side wall 52 which defines an open end 54, and an integral bottom wall 56 providing a closed end. In FIG. 9, tubing 60 has a side wall 62 defining open top end 64 and open bottom end 66. In both tube 50 and tubing 60, the molecular orientation of the side walls is the same as illustrated in FIG. 5 for the syringe barrel of the invention.

The mechanical properties of the injection spin molded syringe barrel (Example II) were compared in Example IV with the properties of a conventional injection molded barrel (Example III). It was found that energy at yield (defined conventionally as integrated stress over strain up to the yield point) was about 20% higher in the circumferential direction because of drag flow induced orientation resulting from core pin rotation.

Figure 7:
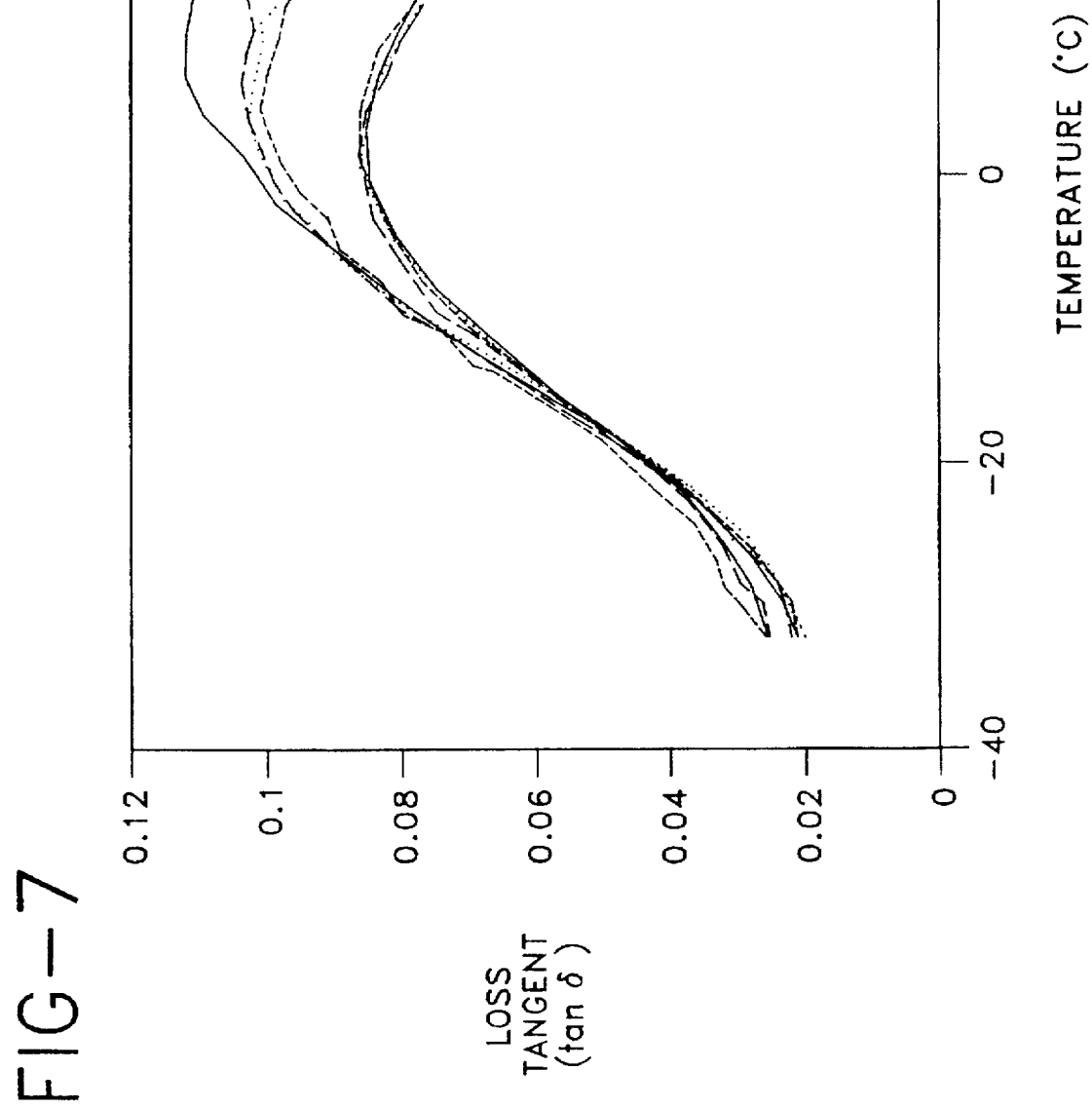
FIG. 7 compares the loss tangent of syringe barrels made by the injection spin process of the invention and by conventional injection molding.

Further, the conventional loss tangent, which is independent of sample geometry, increased significantly as a result of core rotation (Example V, FIG. 7). Larger loss tangent is conventionally associated with more favorable impact properties, i.e., resistance to cracking from impact.

EXAMPLE I

A four cavity syringe barrel mold was constructed including one cavity in which the core pin was connected to a 0.5 hp motor controlled by a computer in a programmed timing sequence. A mechanical-electronic switch was installed in the molding machine so that, when the mold closed, an electronic signal was sent to an analog/digital board in the computer to give reference time. Using a computer timer, the exact time for starting and stopping the spinning of the core pin was specified.

EXAMPLE II
Preparation of IPP-S Syringe Barrel

Using the apparatus described in Example I, IPP resin was injected into a 20 cc syringe barrel mold cavity 10 cm long and 2 cm in diameter. A core pin dimensioned to give a barrel wall thickness of about 1 mm was positioned in one cavity of the mold. The molding parameters were 238° C. injection temperature, 5000 psi (34 megapascals, MPA) packing pressure for 1 second, then 2000 psi (14 MPA) for 0.2 sec, 27° C. mold temperature, 200 psi (1.4 MPA) back pressure and 200 rpm screw speed.

When the cavity was filled (about 1.5 sec), rotation of the core pin was started and reached a maximum of 195 rpm after 0.5 sec. After three rotations of the pin, rotation was stopped. A cooling period of 10 sec. was used prior to opening the mold.

COMPARATIVE EXAMPLE III
Preparation of IPP-N syringe barrel

Using the apparatus described in Example I, IPP was molded without the core pin rotation step. The syringe barrel made in this example without core pin rotation was visually identical to the barrel made in Example II with spinning.

EXAMPLE IV

The tensile strength of the injection spin molded syringe barrel of Example II and the conventional injection molded barrel of Example III was determined using an Instron 1122 universal testing machine.

Because the tensile properties may be anisotropic, tensile strength was evaluated on both 10×1 cm barrel segments cut longitudinally into strips and on 1 cm wide rings cut transversely. Five replicates were evaluated for each. The results of these tests are given in the TABLE below wherein the data for each property is given as the ratio of IPP-S to IPP-N, measured at the yield point.

TABLE

| Property | TD (ring) | MD (strip) |
| --- | --- | --- |
| Energy | 1.226 | 1.026 |
| Stress | 1.038 | 0.960 |
| Strain | 1.140 | 1.011 |
| Modulus | 0.998 | 0.970 |

It is seen from the Table that each property shows improvement when measured in the TD due to core pin rotation relative to the MD in which longitudinal orientation predominates. In particular, TD energy at yield shows a 20% improvement. These test results show in general the improved mechanical properties resulting from the core pin rotation.

EXAMPLE V

Dynamic mechanical properties of the syringe barrels of Examples II (IPP-S) and III (IPP-N) were tested using a Theological solid analyzer (Rheometrics™ RSA-II), Rheometrics, Piscataway, N.J. Four ring specimens of about 1×1.2×10 mm were cut from four evenly spaced areas of the barrels. The RSA-II was operated in a temperature sweep mode, ranging from −35° C. to 35° C., 30 rad/s frequency and 300 g static force (tension mode) with dynamic strain set at 0.001%.

The results of the RSA-II testing is given in FIG. 7. It is seen that the loss tangent is about 20% higher for IPP-S (curves A–D) compared to IPP-N (curves E–H) at all temperatures above 0° C.

EXAMPLE VI

Wall thickness of the barrel was measured on ring sections, using calipers, near the gate and 180° around the ring. A ratio of maximum to minimum wall thickness was used to indicate uniformity. A ratio of 1.0 indicated uniform wall thickness around the barrel. Three replicates were used. The barrel of Example III (without core pin spin) was 1.14±0.12 mm thick. With core pin spinning, the thickness was 1.14±0.02 mm, a six fold improvement in wall thickness uniformity. It is believed that the improved uniformity is due to reduction in core pin deflection by the spinning.

What is claimed:

1. A process for molding a hollow article comprising:

a) causing a molten polymer to flow into the cavity of a mold containing a core pin, a wall of said mold and a wall of said core pin defining said cavity therebetween;

b) allowing polymer molecules in a skin layer adjacent said mold wall and in a skin layer adjacent said core pin wall to solidify leaving a molten core layer therebetween;

c) rotating said core pin transversely to the direction of flow of said molten polymer into said cavity subsequent to the solidification of said skin layers;

d) allowing said molten core layer to solidify in said mold, steps (a) to (c) resulting in biaxial orientation wherein molecules in said skin layers are oriented in the direction of polymer inflow and molecules in said core layer are oriented transversely thereto; and e) removing said article from said mold.

2. The process of claim 1 wherein said polymer is injected into said cavity under pressure.

3. The process of claim 1 wherein said polymer is a polyolefin.

* * * * *